455/604

United States Patent [19]

Carroll et al.

[11] 4,398,172

[45] Aug. 9, 1983

[54] VEHICLE MONITOR APPARATUS

[75] Inventors: Robert J. Carroll, Plano, Tex.; Roger A. Keller, Livonia; E. James Lane, Highland, both of Mich.; Freddie G. Williams, Huntington Beach, Calif.

[73] Assignee: Eaton Corporation, Cleveland, Ohio

[21] Appl. No.: 271,476

[22] Filed: Jun. 8, 1981

[51] Int. Cl.³ .................. G08G 1/04; G08C 17/00; H04B 9/00

[52] U.S. Cl. .................. 340/38 P; 250/338; 340/870.28; 340/825.54; 455/604

[58] Field of Search .................. 340/38 P, 52 F, 38 R, 340/38 L, 825.54, 870.28; 364/442; 250/336, 338, 340, 341, 342, 336.1; 455/604

[56] References Cited

U.S. PATENT DOCUMENTS

| | | | |
|---|---|---|---|
| 3,934,188 | 1/1976 | York | 320/48 |
| 4,025,791 | 5/1977 | Lennington et al. | 250/341 |
| 4,112,421 | 9/1978 | Freeny | 343/112 |
| 4,121,102 | 10/1978 | Wilson | 250/341 |
| 4,188,618 | 2/1980 | Weisbart | 340/52 F |
| 4,207,468 | 6/1980 | Wilson | 250/341 |
| 4,217,588 | 8/1980 | Freeny | 343/112 |
| 4,258,421 | 3/1981 | Juhasz et al. | 340/52 F |
| 4,325,146 | 4/1982 | Lennington | 455/604 |

*Primary Examiner*—James J. Groody
*Attorney, Agent, or Firm*—C. H. Grace; J. G. Lewis; R. A. Johnston

[57] ABSTRACT

A vehicle monitor (10) apparatus for monitoring vehicles (14) in a monitoring location (17). A vehicle unit (12) mountable in a vehicle includes circuitry (21) for transmitting, on a continuous repetitive basis, information characterizing the vehicle and unique thereto. In addition, a monitoring unit (16) mountable at the monitoring location includes circuitry (33) for receiving information transmitted by the vehicle unit. Such monitoring circuitry includes an infrared light receiver (29) and a preamplifier with ambient light compensation circuitry (100) connected thereacross.

23 Claims, 23 Drawing Figures

FIG. 1
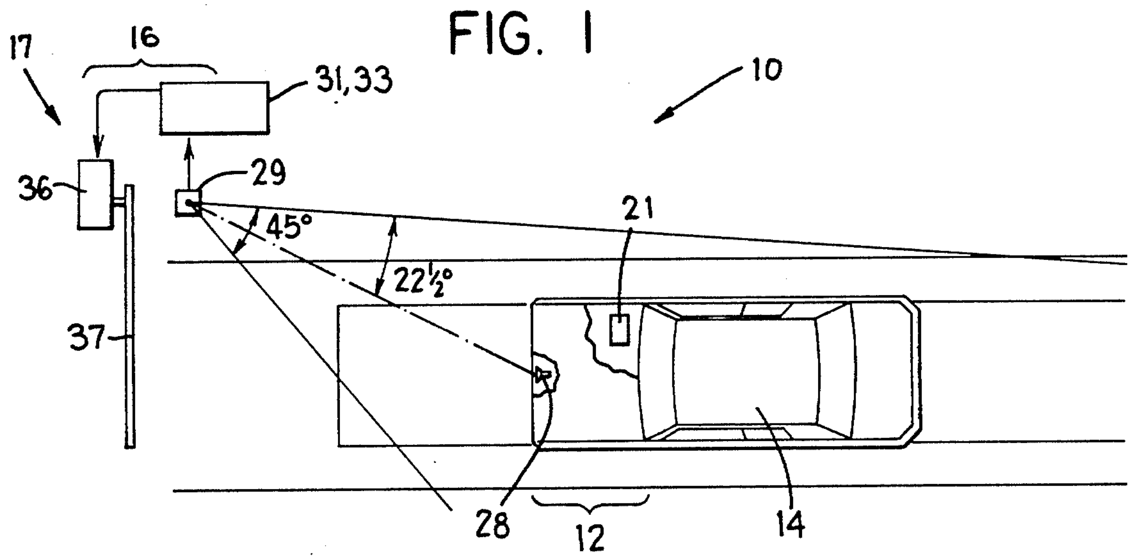
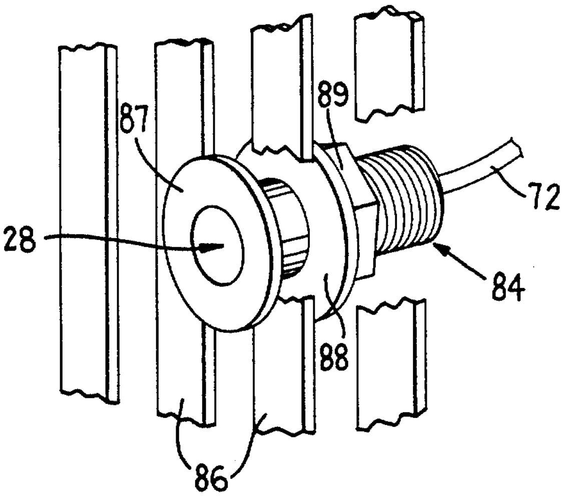
FIG. 3

VEHICLE UNIT

TRANSMIT DATA

RECEIVE DATA

GROUND STATION

INITILIZE

WAIT FOR DATA

LIFT GATE

VEHICLE DATA RECEIVE

OUTPUT DATA TO VEHICLE

VEHICLE MONITOR APPARATUS

FIELD OF THE INVENTION

This invention relates to a vehicle monitoring system for automatic acquisition, without physical connection, of information from a vehicle passing the boundary of a controlled access area.

BACKGROUND OF THE INVENTION

U.S. Pat. No. 4,207,468 (Wilson) discloses a system for identifying vehicles, each carrying an infrared transponder, as they enter or exit a parking facility. An interrogator unit at a fixed location (at the entry or exit of the parking facility) senses the approach of the vehicle and transmits a sequence of interrogating light pulses to a transponder on the approaching vehicle. The transponder uses the interrogator pulses to clock its own transmission back to the fixed interrogator of light pulses encoding the identification number of that particular vehicle. U.S. Pat. Nos. 4,025,791 and 4,121,102 disclose similar systems.

The present invention provides an overall simplification in avoiding the need for two-way communication between the fixed location and a passing vehicle.

The objects and purposes of the present invention include provision of:

A vehicle monitor system capable of effective infrared transmission of data to a fixed ground station from a vehicle moving therepast despite wide variation in ambient light conditions from darkness to bright sunlight.

A system, as aforesaid, which automatically monitors and stores, within the vehicle, information relevant to vehicle condition, including miles traveled and fuel tank level, and which repetitively transmits such information and the identity of the vehicle via infrared light for reception at a ground station during movement of the vehicle therepast.

A system, as aforesaid, in which both the vehicle based transmitting unit and ground station based receiving unit include microprocessor circuitry.

A system, as aforesaid, in which the transmissions from the vehicle permit the ground station to operate devices responsive to vehicle approach, such as barriers, alarms or the like and to provide print-outs, relating to billing of rental vehicle use, vehicle maintenance or replacement, and the like, and in which the ground station is capable of supplying data to existing data processing equipment, such as billing equipment, of the system operator.

A system, as aforesaid, which is adaptable with little or no structural change to a wide variety of vehicle types, land based or otherwise, and to a wide variety of ground station purposes.

A system, as aforesaid, usable for monitoring vehicles of fleet operators, including monitoring of rental cars at, entering, or leaving car rental locations, and which is adaptable to a variety of fleet applications, as for utility vehicles such as telephone, gas and electric company truck fleets, taxi fleets and government fleets, and which is readily installable on and removable from vehicles without affecting the appearance or resale value of the vehicle.

SUMMARY OF THE INVENTION

A vehicle monitor apparatus for monitoring vehicles in a monitoring location. A vehicle unit mountable in a vehicle includes circuitry for transmitting, on a continuous repetitive basis, information characterizing the vehicle and unique thereto. In addition, a monitoring unit mountable at the monitoring location includes circuitry for receving information transmitted by the vehicle unit.

BRIEF DESCRIPTION OF THE DRAWINGS

FIG. 1 is a diagrammatic top view of a vehicle monitor system embodying the invention, as installed in a vehicle and ground location.

FIG. 3 is an enlarged, oblique, fragmentary and partially broken view of an infrared transmitter portion of the FIG. 1 system installed in the grill of a vehicle.

DETAILED DESCRIPTION

Figure 2:
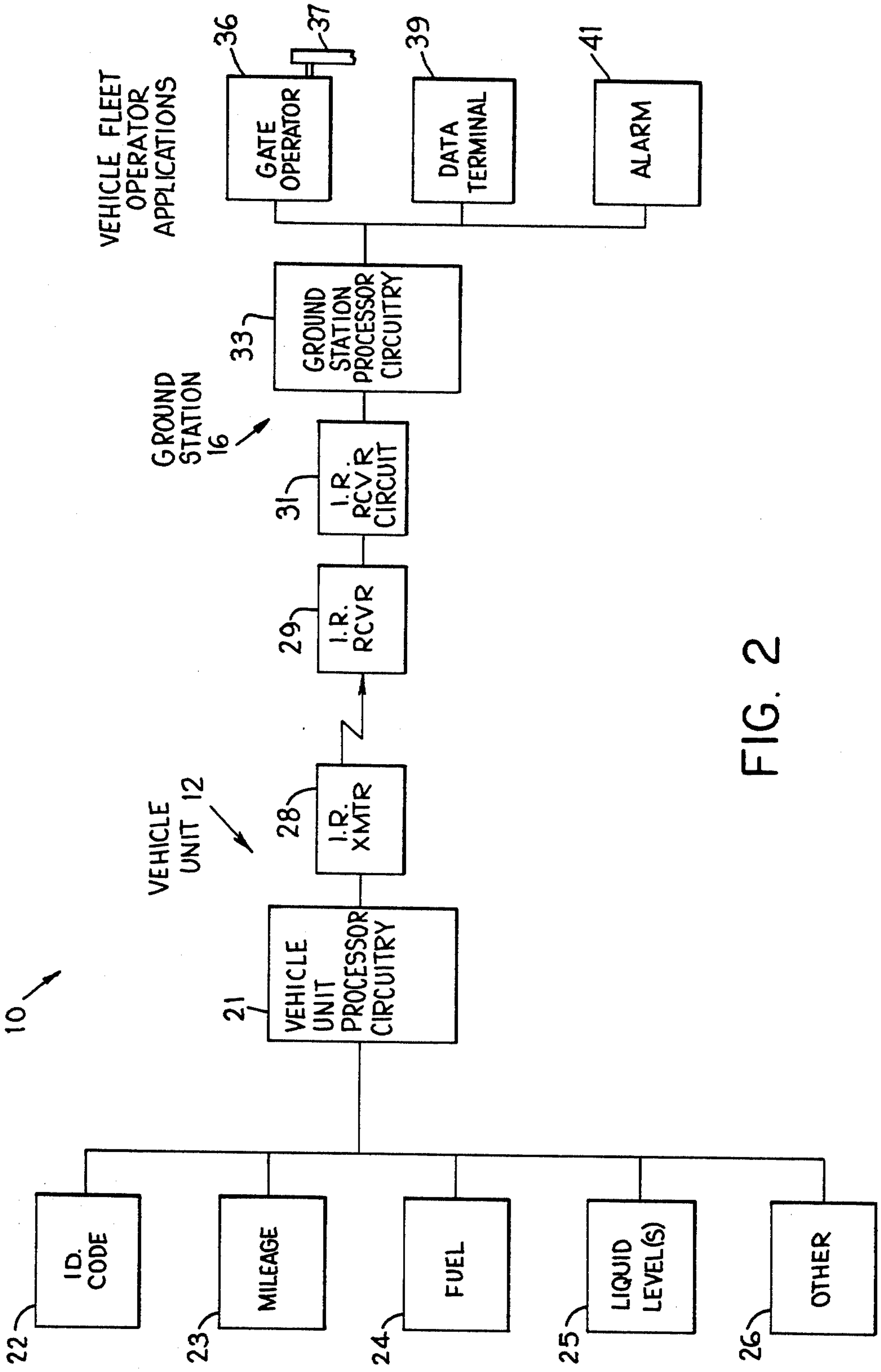
FIG. 2 is a block diagram of the system of FIG. 1.

FIGS. 1 and 2 schematically disclose a vehicle monitor system 10 embodying the invention. The system 10 comprises a vehicle unit 12 mounted on each vehicle 14 to be monitored and a ground station 16 located at a fixed location 17 to monitor passing vehicles. While adaptable to a variety of applications, the system 10 is disclosed, by way of example, in connection with monitoring of rental cars approaching or leaving a rental agency lot.

The vehicle unit 12 comprises processor circuitry 21 mountable in any convenient location in the vehicle, such as under the dashboard, on the firewall, or in the trunk. The processor circuitry 21, as hereafter more fully discussed, includes a microprocessor unit 46 containing registers which receive and store data encoding the vehicle identification number, mileage (miles traveled) and fuel remaining and, if desired, other functions such as spare tire presence, engine functions, tire pressure, liquid levels, etc., from sources schematically indicated at 22-26. A transmitter 28 inconspicuously mounted on the vehicle repetitively transmits the aforementioned data by infrared light to a receiver 29 at the ground station 16 as the vehicle approaches the latter. The infrared receiver 29 applies corresponding electrical signals through an infrared receiver circuit 31 to ground station processor circuitry 33 which provides outputs for operating various vehicle fleet operator devices, such as a barrier operator 36 for operating a barrier, or gate, 37 in the path of the vehicle 14 entering or leaving a rental car lot, an alarm 41 and/or a data terminal 39. The latter may, for example, handle automatic billing of car rentals, and vehicle inventory records relevant to fuel usage and efficiency, vehicle maintenance and replacement needs, and the like.

VEHICLE UNIT PROCESSOR CIRCUITRY 21 AND I.R. TRANSMITTER 28

Figures 4, 4A:
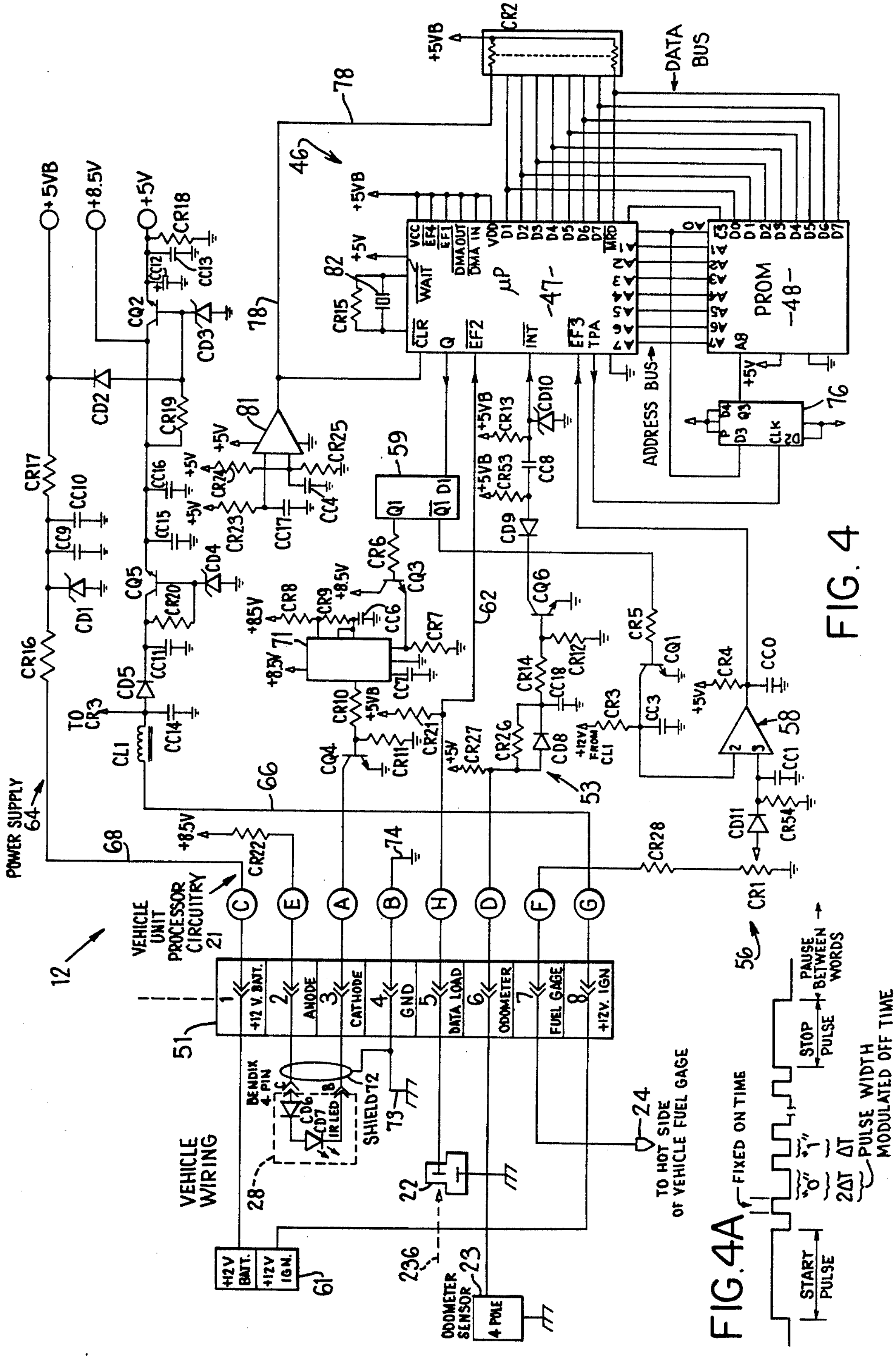
FIG. 4 is a circuit diagram of the vehicle based portion of the FIG. 1 system.
FIG. 4A is a preferred data word format used in the vehicle mounted circuitry of FIG. 4.

FIG. 4 discloses a preferred vehicle unit 12. The vehicle circuitry 21 includes a software programmed microprocessor section 46 here comprising two discrete units, namely a CMOS microprocessor 47 in circuit with a discrete 512×8 PROM (programmable read only memory) 48. In the example shown, microprocessor 47 is an RCA type 1802 CMOS microprocessor joined with a type 74S 472 512×8 PROM, though other types may be substituted. The CMOS type microprocessor was chosen to keep vehicle battery power drain as low as possible, while retaining data in memory, with the vehicle ignition switch off. However, the separate units 47 and 48 may be replaced by a single microprocessor chip of adequate memory capacity and low power drain memory-keep-alive capability.

A conventional releasable connector block 51 is interposed between the vehicle processor circuitry 21 and associated input-output elements hereafter described, for quick disconnection for servicing or removal to another vehicle of the processor circuit 21 and/or associated input and output elements.

The odometer sensor 23 conveniently comprises a reed switch operated by a magnet or magnets on a portion of the vehicle rotating in proportion to vehicle speed such as the speedometer cable output of the transmission or part of a cruise control drive. The odometer sensor 23 produces pulses in number proportioned to the miles traveled by the vehicle. The odometer sensor pulse train is applied through connector 6 of the connector block 51 through a pulse conditioning network 53 to the interrupt input $\overline{INT}$ of microprocessor 47.

The first part of network 53 applies the odometer sensor pulse train to the base of a transistor CQ6 while filtering noise from the pulse train and includes a voltage divider wherein a resistor CR27, diode CD8 and resistors CR14 and CR12 connect from a positive voltage supply 5 V (hereafter discussed) to circuit ground. Ground resistor CR12 permits the base of the transistor CQ6 to be pulled low between odometer pulses and thus turn off the transistor CQ6. Positive odometer sensor pulses are applied serially through diode CD8 and current limiting resistor CR14 to the transistor base. The diode CD8, a shunt resistor CR26, and a grounded capacitor CC18 cooperatively filter noise and prevent reading of switch bounce. In particular, diode CD8 quickly charges capacitor CC18 when the odometer pulse train swings positive but precludes rapid discharge of the capacitor CC18, should a spurious negative-going spike occur early in the positive odometer pulse (in the manner of switch bounce), so as to maintain conduction of transistor CQ6 throughout the normal positive odometer pulse. Transistor CQ6 is thus conductive during each odometer sensor positive pulse.

At very low speeds, the pulses from the reed switch odometer sensor 23 may be very wide. The later half of the conditioning network 53 shapes the odometer sensor pulses to apply corresponding pulses of narrow substantially contant width to the interrupt input $\overline{INT}$ of the microprocessor and comprises diode CD9, resistors CR53 and CR13, capacitor CC8 and Zener diode CD10. Resistors CR53 and CR13 are connected to a regulated positive voltage supply 5 VB.

In operation, the rise of an odometer sensor pulse turns on transistor CQ6, which through diode CD9 immediately pulls down the voltage on both sides of capacitor CC8. Then, in a short time, the capacitor CC8 is charged through resistor CR13 to complete a short duration negative-going (down from +5 volts) pulse which starts substantially simultaneously with a positive-going odometer sensor pulse but, unlike the latter, is of short duration independent of vehicle speed. Such negative-going pulse actuates the interrupt input INT of the microprocessor 47. When the positive-going odometer sensor pulse terminates and transistor CQ6 turns off, the left side of capacitor CC8 rises to the positive supply potential at 5 VB and the right side of the still charged capacitor, rises past the potential 5 VB. The Zener CD10 limits the positive rise of the right side of capacitor CC8 so that it does not materially exceed the positive supply voltage 5 VB.

The odometer sensor 23 can if desired be other than a reed switch, for example, a Hall effect sensor or other sensor capable of reading down to zero vehicle speed. Because the circuit is to accumulate miles traveled, it is necessary to have an odometer sensor output even when the vehicle is moving very slowly.

The fuel pick-up 24 is preferably simply an electrical connection to the "hot" side of the existing fuel gauge circuit of the vehicle. The pick-up 24 connects through connector 7 of the connector block 51 to a fuel level sensing circuit 56. The particular type of fuel sensing circuit 56 employed depends on the type of fuel sensing circuit in the vehicle. For example, Ford and Chrysler have in the past used pulse-type sending units, and the particular circuit 56 shown is adapted thereto. On the other hand, pulse width modulating sending units are becoming popular and substitution at 56 of a circuit adapted to process signals of that type, or other types, is contemplated.

In the fuel sensing circuit 56 shown, pulses from the fuel pick-up 24 are applied through a grounded voltage divider comprising a series resistor CR28 and a potentiometer CR1, thence through the wiper of the latter and a diode CD11 to the noninverting input 3 of an operational amplifier 58 acting as a continuous reading peak detector. A parallel resistor CR54 and capacitor CC1 connect input 3 to ground and with diode CD11 help to hold the input 3 of peak detector 58 continuously at the positive peak potential of the pulses applied to the fuel pick-up 24.

When the program of the microprocessor 47 comes to its fuel update routine, microprocessor output Q applies a pulse to the $\underline{D1}$ input of a flip-flop 59 so that the flip-flop output $\overline{Q1}$ switches low and through a resistor CR5 turns off a normally conductive transistor CQ1. The transistor CQ1 receives collector current in series through a collector resistor CR3, an inductor CL1 (in the vehicle unit power supply hereinafter described) and part 8 of connector block 51 from the switched side of the vehicle ignition switch 61, when the latter is on to operate the vehicle. The conductive transistor CQ1 clamps the capacitor CC3 near ground. However, when the transistor CQ1 is turned off, the 12-volt supply through resistor CR3 gradually charges capacitor CC3, forming a voltage ramp on inverting input 2 of the peak detector 58. The voltage applied to resistor CR3 is referenced to the vehicle battery voltage, by ignition switch 61, to maintain proportionality with the fuel gauge circuit in the vehicle, and thus compensate for variations in the fuel pick-up 24 voltage due to variations in vehicle battery voltage.

The voltage ramp on input 2 of the peak detector amplifier 58 will, after an interval of time proportional to the amount of fuel in the vehicle fuel tank, rise to the peak magnitude of the fuel gauge pulses on input 3 of peak detector 58. When these two voltages are equal, the peak detector 58 output switches low and drops the normal positive potential on microprocessor input $\overline{EF3}$. A series resistor CR4 and capacitor CCO connect from the regulated positive supply 5 V to ground and sets the normal positive potential of microprocessor input $\overline{EF3}$ connected therebetween. The microprocessor 47 keeps track of the time required for the formation of the voltage ramp, namely the time from the microprocessor output Q pulse to the peak detector output to microprocessor input $\overline{EF3}$. The microprocessor 47 thus reads a time interval proportional to the amount of fuel remaining in the vehicle tank.

The microprocessor unit 46 also stores the identification number of its vehicle. The vehicle identification number is programmed into the PROM 48 at the factory where the vehicle monitor system is constructed, or on the site when the vehicle unit 21 is installed in the vehicle. Programming the vehicle number on site is simplified by having the PROM 48 preprogrammed with all data but the vehicle identification number, with addresses in the PROM left open for the vehicle identification number to be programmed in on the site. No updating of the vehicle identification number is required while the vehicle unit processor circuitry 28 remains in the same vehicle.

When a vehicle unit processor circuit 28 is first installed in a vehicle, it is necessary to load into the microprocessor unit 46 data representing the initial number of miles appearing on the vehicle odometer. This is accomplished (as further discussed hereafter) from conventional data terminal 39 (FIG. 2), via a conventional plug and socket connector 22 and temporary cable 236 and ground station circuit 33, to enable a human operator at the keyboard of the data terminal 39 to type in the initial vehicle odometer mileage. The data pulses thus applied to connector 22 pass through part 5 of connector block 51 and through a line 62 to input EF2 of microprocessor 47. A resistor CR21 connected to regulated positive voltage supply 5 VB holds the line 62 high in the absence of data pulses at connector 22. In this manner, the initial vehicle mileage data is loaded into the mileage storage register in the microprocessor 47. There is normally no need to repeat this manual loading of initial mileage unless the vehicle processor circuit 28 is removed to another vehicle.

FIG. 4 includes a DC power supply 64 providing positive voltage supplies indicated at 5 V, 8.5 V and 5 VB, the former two being regulated supplies at 5 and 8.5 volts, respectively. Considering first the regulated supplies, 12-volt DC power from the vehicle ignition switch 61 is applied through line 66 and part 8 of connector block 51 in series to filter inductor CL1, diode CD5, and a series pass transistor CQ5 to the regulated 8.5 V power supply output 10. The series pass transistor CQ5 maintains the 8.5 volt output by reason of connection of its base between a series resistor CR20 and Zener diode CD4 running from the cathode of diode CD5 to ground. Conventional grounded capacitors CC14, CC11, CC15 and CC16 provide filtering.

A further series pass transistor CQ2 connects from the regulated 8.5 V output to the regulated 5 V output and regulates the latter at positive 5 volts due to connection of its base intermediate the series resistor CR19 and Zener diode CD3 running from the positive supply line to ground. Parallel capacitors CC12 and CC13 and resistor CR18 from terminal 5 V to ground provide further filtering and voltage stability.

A line 68 connects directly from the positive side of the 12-volt vehicle battery through section 1 of connector block 51 to resistors CR16 and CR17 in series with the 5 VB supply output. Between the resistors CR16 and CR17, a Zener diode CD1 and filter capacitors CC9 and CC10 connect to ground to provide voltage stability and filtering.

Thus, the 5 VB terminal is held at about positive 5 volts even when the vehicle ignition switch 61 is off and enables the microprocessor unit 46 to maintain data stored in its registers (in this embodiment vehicle mileage and fuel level) while the vehicle is not operating. The remaining circuitry is energized by the 8.5 V and 5 V power supply terminals which are active only when the vehicle ignition is turned on. A diode CD2 connects from the base of transistor CQ2 to the 5 VB terminal so that, while the vehicle ignition switch is on, the 5 V and 5 VB terminals will carry the same voltage, each being one diode voltage drop (namely the drop across diode CD2 and the drop across the base emitter junction of transistor CQ2) below the base potential of transistor CQ2. It will be understood that the voltages appearing on terminals 5 VB, 8.5 V and 5 V may be changed in magnitude and/or polarity to accommodate changes in circuitry components and that the above-named power supply voltage values are mentioned by way of example only.

The microprocessor 47 includes a mileage resistor and a fuel register. The microprocessor program sequentially updates the mileage register and fuel register and then serially outputs the data therefrom, along with the stored vehicle identification number, to the vehicle transmitter on a continuous loop basis, as indicated by the FIG. 7 flow chart. The latter provides for continuous loop operation in the sequence of a delay interval, an update mileage interval, an update fuel level mileage, a transmit data and then a repetition of the delay interval. During the delay interval the microprocessor checks to see if data is being received from the initial mileage plug-in terminal 22.

The pulses coming in from the odometer sensor are not synchronized with the microprocessor program in any way and are serviced by an interrupt routine in the program. Thus, every time there is a pulse from the odometer sensor 23, the resulting pulse from pulse conditioning network 53 at microprocessor input INT is brought in on the interrupt routine, namely wherein the interrupt jumps up to a separate part of the program, services that interrupt pulse, holds the fact that it was interrupted, or if it was interrupted more than once, until the program progresses to the update mileage routine at which time the temporarily held mileage data is read into the mileage register of the microprocessor 47. In effect then, the interrupt routine of the microprocessor stands between pulses as supplied by the odometer sensor and subsequent storing of corresponding pulses in the microprocessor mileage register. The mileage register of the microprocessor itself provides essentially a temporary storage of the pulses initiated by the odometer sensor, until such mileage register is again updated due to continuing travel of the vehicle.

Whereas during vehicle operation, the accumulation of miles occurs relatively rapidly, the fuel level in the vehicle tank diminishes relatively slowly, and thus can be detected and applied to the fuel register in the microprocessor as one part of the continuous loop operation of the program of the microprocessor 47.

Figure 7:
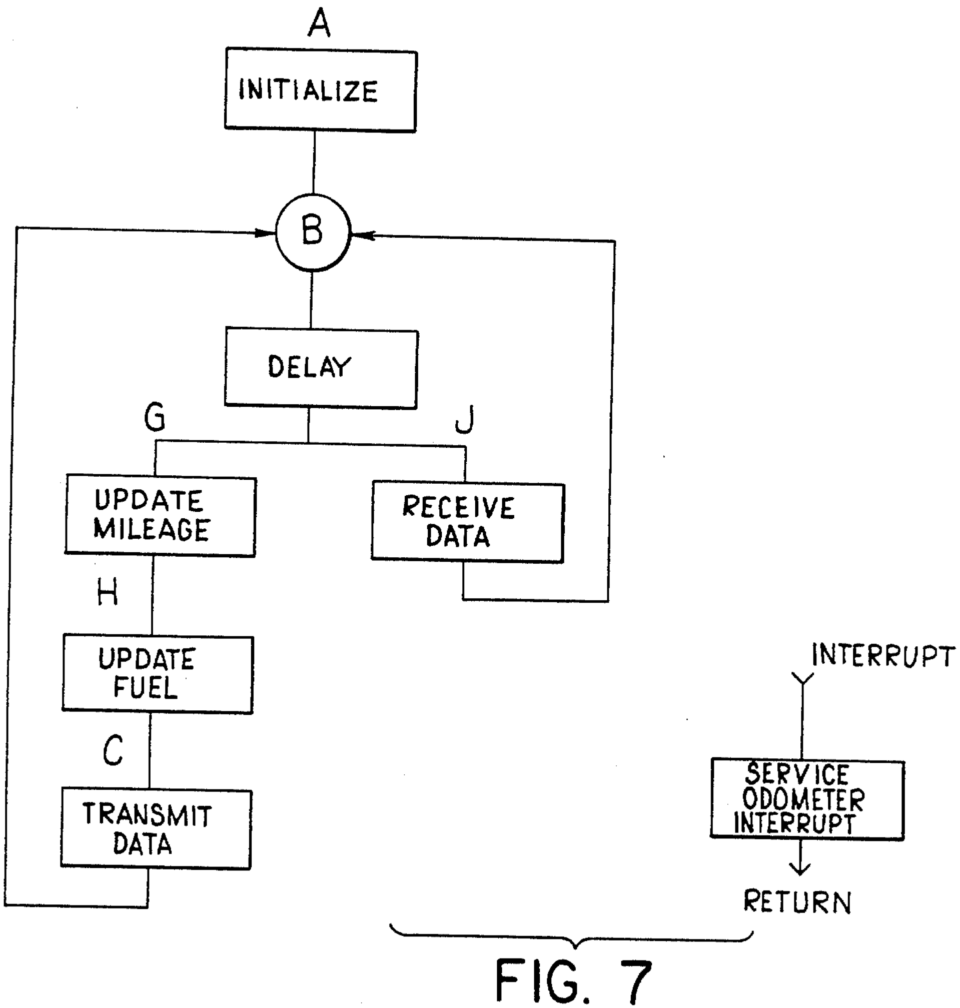
FIG. 7 is a flow chart schematically indicating operation of the FIG. 4 vehicle processor circuitry.
Figure 7A:
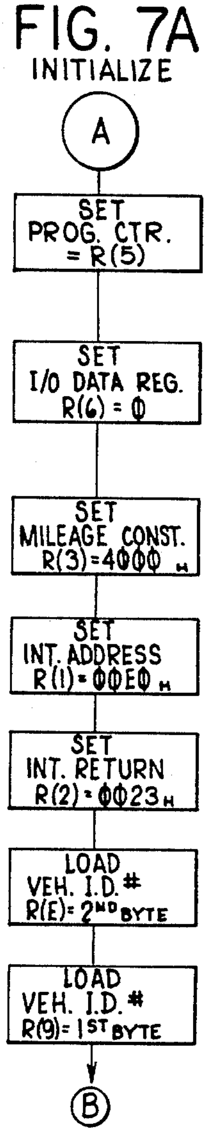
FIGS. 7A–7F are more detailed flow charts respectively corresponding to identified blocks of FIG. 7.
Figure 7B:
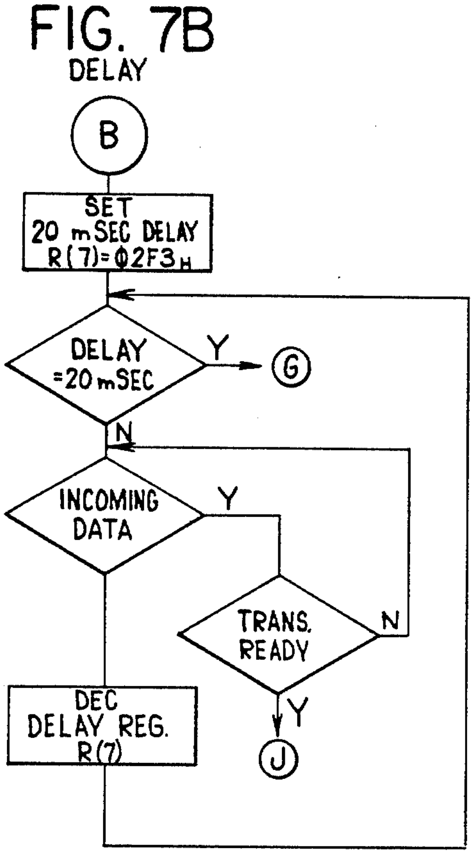
Figure 7C:
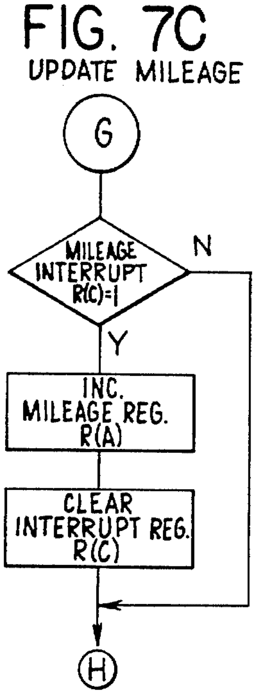
Figure 7D:
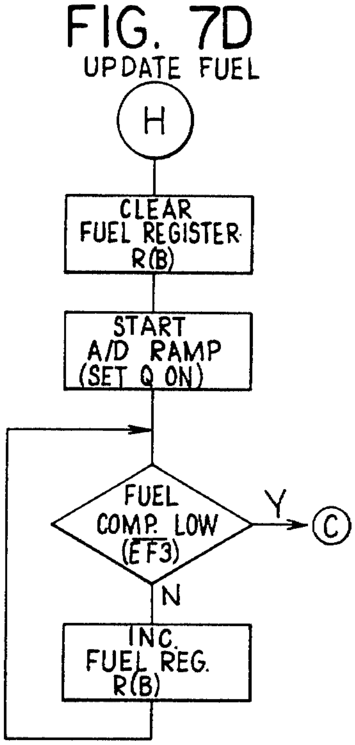
Figure 7E:
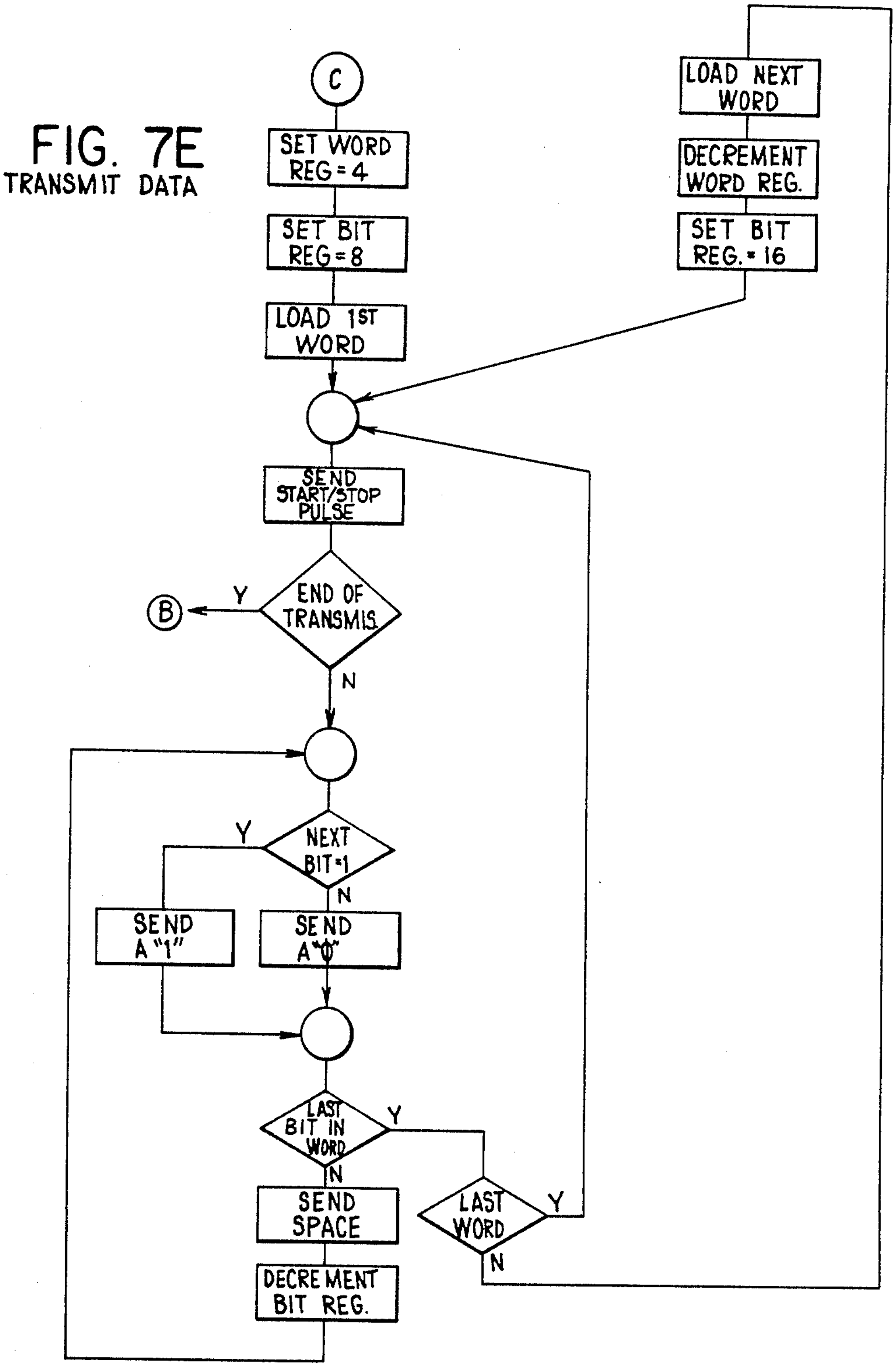
Figure 7F:
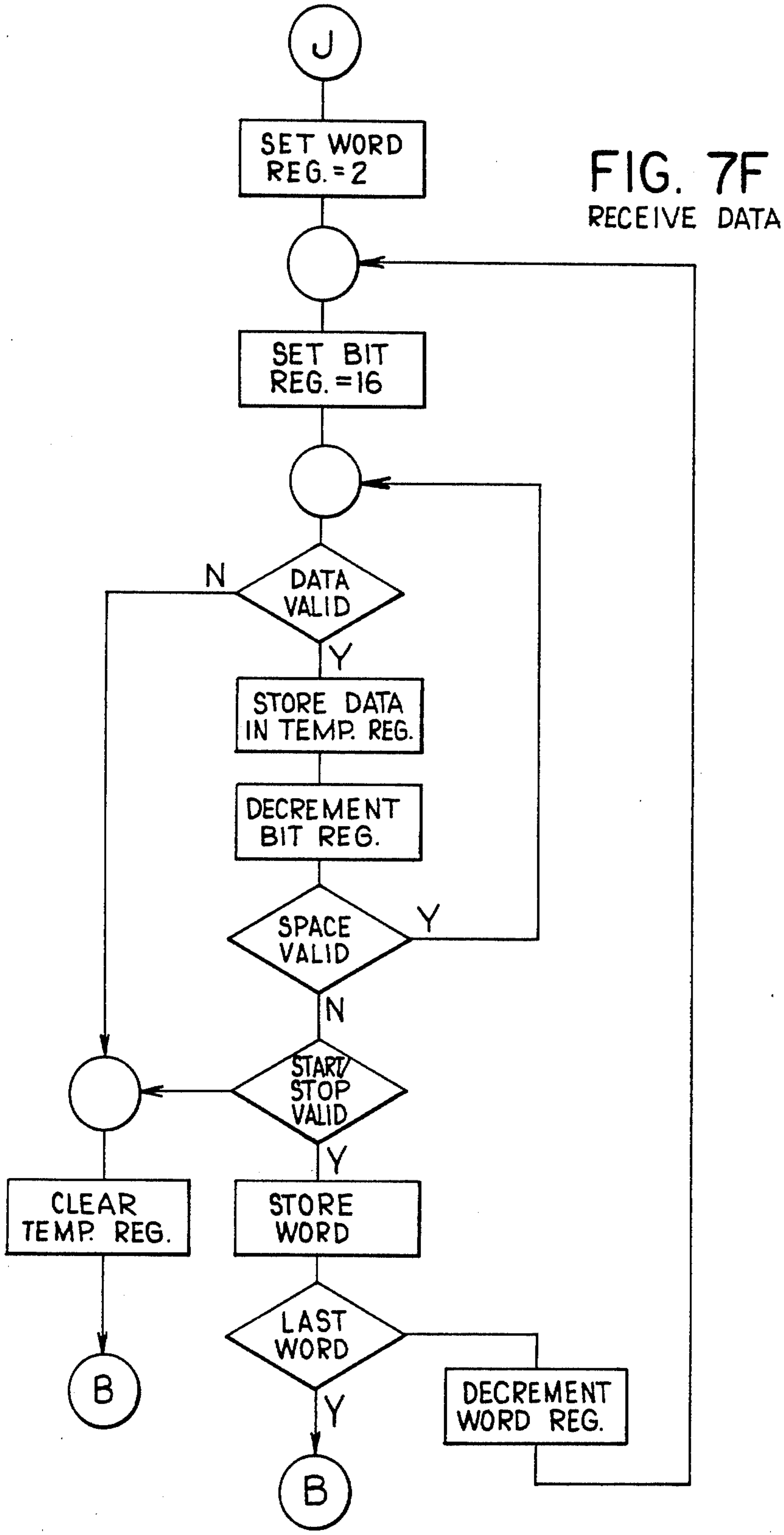

As seen from the FIG. 7 flow chart, after sequentially updating its mileage register and fuel register, the transmit data portion of the program occurs and causes the microprocessor to serially output to the infrared transmitter 28 the vehicle identification number, mileage and fuel on a continuous loop basis. Again, interrupts from the odometer sensor are serviced immediately with the resulting information being held for the next mileage register update. The format for data transmission is several multibit words, each word beginning and ending with a start/stop pulse, with a pause between complete transmissions.

As seen in FIG. 4A, the train of pulses in each word are structured such that in each pulse cycle there is a fixed duration on time and a pulse width modulated off time. An off time of one unit duration $\Delta T$ corresponds to a logic 1 and a double duration off time ($2\Delta T$) corresponds to a logic 0. The vehicle unit is passive in the sense that it is not interrogated by the ground station to commence transmitting data. The microprocessor 47 repeats its operational cycle about four times per second. The cycle comprises a five milli second delay serial data transmission of an 8-bit code word, two 16-bit words of vehicle identification, a 16-bit word of mileage data, and a final 16-bit word of half remaining mileage data and half fuel level.

During the transmit data part of its cycle, the microprocessor 47 thus produces serially the data pulse train of each successive word on its output Q. A timer 71 is set up as a 50 kHz oscillator by means of the network comprising resistors CR8 and CR9 and capacitor CC6, as well as further capacitor CC7 and resistor CR7 and connections to the 8.5 V power supply line, to produce a 50 kHz carrier signal which is applied through a resistor CR10 to the base of a transistor CQ4. The latter is tied to ground through a resistor CR11. The flip-flop 59 is controlled at its input D1 by the data pulses at the output Q of microprocessor 47. Accordingly, the output Q1 of the flip-flop 59 applies such data pulse train through a resistor CR6 and transistor CQ3 to turn on and off the 50 kHz output of oscillator 71 in correspondence to the polarity of pulses in the data pulse train appearing at microprocessor output Q. This pulse width modulates the 50 kHz signal which is applied by transistor CQ4 through section 3 of connector block 51 to the infrared transmitter 28. More precisely in the present embodiment, a conductive path is provided from the 8.5 V positive supply through a resistor CR22, section 2 of the connector block 51, a diode CD6 in the infrared transmitter 28, an infrared LED (light emitting diode) CD7 in such transmitter, section 3 of connector block 51, the collector and emitter of transistor CQ4 to circuit ground. For noise protection, the conductors extending from the connector block to the infrared transmitter 28 are in a shielded cable, the shield 72 of which is grounded to vehicle ground at 73 and through a further section 4 of the connector block 51 to circuit ground at 74.

The format of the data pulse train permits validating of the data received at the ground station. Several validating techniques are employed. For example, the fixed pulse on times (FIG. 4A) may be checked for duration within tolerance. The pulse off times may be checked to be sure their duration is not too short to be a logic 1 and not too long to be a logic 0. Further, the first word, which is here 8 bits in length, is a preset arbitrary code. Other checking techniques can be employed. The purpose is to be sure the data is received correctly before same is entered at the ground station. If a given transmission fails a check, that transmission can be ignored and the ground station can be allowed to wait for the next transmission cycle. The ground station is allowed to continue reading received data until it has received correctly the full set of words in a given transmit data cycle part of the microprocessor 47.

The PROM 48 performs the conventional housekeeping function of reading the address bus (parallel A0-A7 outputs) of microprocessor 47 and outputing the required step from the program stored in the PROM via the data bus, from the parallel D0-D7 outputs of the PROM to the parallel D0-D7 inputs of the microprocessor 47. A latch (flip-flop) 76 connects at its input D3 to address line A0 of the address bus. Timing pulses from an output TPA of the microprocessor 47 drive the clock input CLK of the latch 76, the output Q3 of which controls the address-read control input A8 of PROM 48. Thus, when output TPA is high, the PROM reads the address from the address data bus A0-A7. In the next half-cycle of output TPA, the PROM outputs instruction data stored in the just-read address to the microprocessor data bus inputs D0-D7. A parallel set CR2 of pull-up resistors maintains the data bus lines D0-D7 (and a further line 78 connected to the clear input CLR of microprocessor 47) normally pulled up to the positive supply voltage at terminal 5 VB. Thus to pass an instruction data bit on a given data bus-line D0-D7, the corresponding PROM output pulls down essentially to ground the normal 5-volt potential on that data bus line.

Address line A0 resets latch 76 when the address code has been transferred from the microprocessor 47 to the PROM 48, to permit the flip-flop to act on the next timing pulse from pin TPA.

A reset circuit comprises an operational amplifier 81 which provides a pulse to the clear input $\overline{CLR}$ of microprocessor 47, to clear the microprocessor and start its program at location 0, when the vehicle ignition switch 61 is first turned on, that is when positive potential first appears at supply terminal 5 V. More particularly, when terminal 5 V first swings positive, current passing through resistor CR24 charges capacitor CC4 rapidly to activate the inverting input of operational amplifier 81 and thereby initiate the negative-going clear pulse to the microprocessor. Soon thereafter the positive potential at supply terminal 5 V acts through resistor R23 to charge larger capacitor C17 sufficiently to bring up the noninverting input of operational amplifier 81 to switch off the negative-going clear pulse. The shunt resistor CR25 in series with resistor CR24 limits the voltage on capacitor CC4 to less than the peak voltage achievable on capacitor CC17. During circuit operation the output line 78 of operational amplifier 81 is normally held high by the corresponding one of the pull-up resistors CR2.

The microprocessor 47 is clocked by a 2 mHz crystal 82 paralleled by a high resistance CR15. The 2 mHz clock steps the microprocessor through its program steps and timing for the microprocessor pulse output at Q is based on the 2 mHz clock.

The microprocessor 47 has a $\overline{\text{WAIT}}$ input which is held high by the 5 V power supply terminal when the vehicle is in operation but is otherwise low, such that when the vehicle is not in operation, the microprocessor 47 goes into a "wait" state to receive power from the vehicle battery through the 5 VB supply terminal at its input VCC, $\overline{\text{EF4}}$, $\overline{\text{EF1}}$, $\overline{\text{DMAOUT}}$, $\overline{\text{DMAIN}}$ and VDD, to avoid loss of data from the current mileage and fuel storage registers contained in the microprocessor.

The infrared transmitter 28 may include a conventional LED light emitting diode and a lens providing a relatively wide angle light output. In the preferred FIG. 3 embodiment, the transmitter 28 is installed in a tubular housing 84 of compact diameter which can readily be installed in most cars, for example between the bars or mesh members 86 of the front grill thereof, without need for drilling holes or otherwise altering the exterior of the vehicle body. The rear end of the tubular housing 84 is insertable rearwardly through an opening in the vehicle grill. Adjacent members 86 of the vehicle grill are gripped firmly between a front flange 87 of the tubular housing 84 and a washer 88 backed by a nut 89 threaded on the rear end of housing 84, from which the shielded cable 72 extends to the connector block 51 of FIG. 4. The FIG. 3 arrangement advantageously reduces installation time and avoids marring of the appearance of the car in such a way as to interfere with resale thereof.

IR RECEIVER 29 AND IR RECEIVER CIRCUIT 31

The infrared receiver 29 (FIG. 5) at the ground station comprises an infrared detector DS1. Though various photoelectric devices may be used, the detector DS1 here comprises a horizontally extending concave array of three photovoltaic cells 101 (FIG. 5B) behind a lens 102 to focus thereon infrared light received through a relatively wide horizontal angle $\alpha$, here 45°. The axis of the infrared receiver 29 normally is angled upstream along the expected vehicle path as in FIG. 1. The infrared receiver 29 will normally be fixed at about the height of the infrared transmitter 28 on the vehicle. A narrow vertical angle of view permits receiving infrared signals from approaching vehicles while limiting unnecessary ambient light input from the daytime sky and overhead lights at night. An infrared passing optical filter may be used to partly reduce ambient light inputs to the cells 101. The individual photovoltaic cells 101 have electrical outputs paralleled to form the composite transducer DS1 output signal.

The receiver 29 and receiver circuit 31 (FIG. 5) receive the modulated carrier infrared light beam from the remote vehicle transmitter 28 and extract a replica of the modulating signal.

In the receiver circuit 31, the photosensor DS1 connects between ground and the inverting input of a preamplifier IC1A having a gain control feedback resistor RR1 connected across its output and inverting input. The currents generated by photosensor DS1, both AC and DC, are multiplied by feedback resistor RR1 to give an equivalent buffered voltage at the output of preamplifier IC1A. Feedback resistor RR1 is made large to give high preamplifier gain at low input current levels. The output of the preamplifier, without the hereafter described closed loop section through feedback amplifier IC7 and without the hereinafter described feedback network including resistors RR2 and RR3 and capacitor RC2, would be equal to the voltage reference at the noninverting input of preamplifier IC1A plus the voltage developed across feedback resistor RR1.

The AC and DC current components from photosensor DS1 include a high frequency AC component corresponding to the pulse modulated infrared carrier from the vehicle and unwanted components, particularly DC current due to ambient light and unwanted lower frequencies such as multiples of the commercial power line frequency. Thus, the high frequency AC light component is to be amplified and the ambient DC light and lower frequency light signals are to be rejected. This is in part achieved by arrangement of series resistors RR2 and RR3, with an intervening capacitor RC2 to ground, in a further negative feedback path from the output to the inverting input of preamplifier IC1A. This network sets up the operating band pass of the preamplifier, providing a frequency related negative DC feedback which substantially kills the DC and low frequency gain of the preamplifier IC1A. However, at high input frequency the feedback network RR2, RR3, RC2 essentially acts as though removed from the circuit leaving control of high frequency gain to resistor RR1, yielding high gain at high frequencies with low frequency gain minimized.

A capacitor RC1 parallels feedback resistor RR1 to provide an upper frequency limit to preamplifier response above the frequency of the transmitted infrared carrier signal and prevent high frequency oscillation of preamplifier IC1A. A resistor RR4 connects the preamplifier output to ground, providing a resistive load to stabilize preamplifier IC1A. A reference voltage applied from a positive DC source X through a resistor RR10 to the noninverting input thereof biases the preamplifier IC1A to the linear part of its range. A grounded capacitor RC3 connected to the noninverting input of preamplifier IC1A minimizes noise on the reference voltage line.

The preamplifier portion, to the extent above described, operates well in low ambient lighting conditions. It will adequately operate with sensor DS1 currents up to 500 microamperes. At greater sensor currents (resulting from higher ambient light levels) preamplifier IC1A saturates positive. The product of RR1x $I_{DS1}$ at that point is in the range of volts. To prevent such saturation of preamplifier IC1A, the following discussed further improvements permit photosensor DS1 current up to approximately 50 milliamperes.

In particular, an ambient compensation feedback network shown generally at 100 includes an ambient compensation amplifier IC7 controlling the base of a power driver transistor Q1. Driver transistor Q1 is connected as an emitter-follower from an unregulated DC supply W through an emitter resistor RR8 to ground and connected through a resistor RR9 to a low resistance choke coil RL1 in turn connected to light sensor DS1 at the inverting input of preamplifier IC1A. The low resistance of choke RL1 allows ambient compensation in excess of 50 milliamps. The choke RL1 here comprises a commercially available 10 millihenry, 100 ohm choke. The choke RL1 and the capacitance of photosensor DS1 also set up a low Q tuned front end. Compensation amplifier IC7 and driver Q1 together have a voltage gain of 1 (set up by parallel negative feedback capacitor RC5 and resistor RR6 connected from the inverting input of compensation amplifier IC7 to the emitter of driver Q1) and a high current gain and are used to feed current to the choke RL1 through the noise filter defined by aforementioned resistor RR9 and a grounded capacitor RC7. The reference voltage from DC supply terminal X and resistance RR10 also is applied through a series resistor RR5 to the noninverting input of compensation amplifier IC7. The output of preamplifier IC1A is fed back through a resistor RR7 to the noninverting input of compensation amplifier IC7. The latter input connects to a grounded capacitor RC4 to render compensation amplifier IC7 nonresponsive to high frequency variations in the preamplifier IC1A output signal. Thus, compensation amplifier IC7 is permitted to compensate for high ambient light conditions, which tend to change very slowly in comparison with the AC data voltage output of the preamplifier. Amplifier IC7 is conventionally compensated with capacitor RC6.

In operation during high light levels, the voltage is held low across photosensor DS1 by the closed loop feedback path through compensation amplifier IC7 and driver Q1. As the impedance of photosensor DS1 decreases with increasing ambient light, the current therethrough increases. This current is also flowing through choke RL1, resistor RR9 and driver Q1. The output of preamplifier IC1A is therefore held relatively constant, even with substantial variations in ambient light level. At the same time however, the output of preamplifier IC1A will reproduce the rapid variations caused by the pulse modulated carrier light pulses from the infrared transmitter 28.

The inverting input of a second amplifier stage IC1B is AC coupled through a capacitor RC8, and a series current limiting resistor RR11, to the output of preamplifier IC1A. Oppositely directed diodes RD1 and RD2 in series with a capacitor RC10 form a negative feedback path from the output to the inverting input of amplifier IC1B to limit the peak-to-peak AC (modulated carrier) output thereof to less than 1.5 volts. This feedback network is paralleled by a capacitor RC11 and a resistor RR12 respectively limiting amplifier gain at frequencies above the data frequency and providing higher gain at lower frequencies, like above-discussed capacitor RC1 and resistor RR1. A capacitor RC9 provides filtering for a reference voltage supplied within the IC chip at the noninverting input of amplifier IC1B.

The output of AC coupled amplifier IC1B is applied to respective negative and positive precision peak detectors comprised by operational amplifiers IC2 and IC3 serially driving respective negatively and positively oriented diodes RD3 and RD4. A resistor RR15 from the output of amplifier IC1B and a grounded capacitor RC12 provide an average DC voltage to the noninverting inputs of amplifiers IC2 and IC3 to reference the two peak detectors. Input resistors RR13 and RR16 apply the modulated 50 kHz carrier from amplifier IC1B to the inverting inputs of peak detector amplifiers IC2 and IC3. Resistors RR14 and RR17 provide feedback connections across the respective series diode and amplifier RD3, IC2 and RD4, IC3 to the noninverting inputs of such amplifiers. Networks RR18, RC13 and RR20, RC14 respectively average the negative and the positive high frequency peaks appearing at the outputs of the respective diodes RD3 and RD4, thereby providing the detected modulating (data) signal, corresponding to the data signal developed in the vehicle processor circuitry 21 and appearing in part in FIG. 4A. A diode RD5 provides a maximum differential voltage of approximately 0.7 volts across the outputs of the positive and negative peak detectors. This voltage difference is applied by resistors RR19 and RR21 to the inverting and noninverting inputs of a conventional ground referenced (through resistor RR22) differential amplifier IC4, the latter being provided with conventional feedback capacitors RC15 and RC16 and resistor RR23.

The detected data signal is AC coupled from differential amplifier IC4 through a capacitor RC17 and series resistor RR24 to the inverting input of a conventional amplifier IC5, which is to provide audio gain. Amplifier IC5 is provided with a negative feedback resistor RR25 and capacitors RC18 and RC19 in the manner above described with respect to differential amplifier IC4. A voltage divider connects from the regulated positive supply terminal Z to ground and here comprises in series the resistor RR26, a junction point 103 and a further resistor RR27. Resistor RR27 is paralleled by a capacitor RC20 to eliminate any power supply transients and, in series, a further resistor RR29 and potentiometer RP1. A resistor RR28 connects through the aforementioned resistor RR24 to the inverting terminal of amplifier IC5 and through junction point 103 to the noninverting terminal thereof to bias the inverting terminal.

The output of amplifier IC5 and the wiper of potentiometer RP1 connect through respective resistors RP30 and RP31 to the noninverting and inverting inputs, respectively, of an input buffer amplifier IC6. In this way, the output of amplifier IC5 is compared to a DC reference voltage set up on the wiper of potentiometer RP1 and this comparison results in digital information at the output of amplifier IC6. The wiper of potentiometer RP1 is settable to control the sensitivity of amplifier IC6 to manually compensate for differences in range (distance between vehicle mounted transmitter 28 and fixed receiver 29). Under close range conditions, the data signal magnitude at the output of stage IC6 is higher in magnitude than it would be in long range operation and any noise pulses interspersed among the data pulses can be reduced in magnitude by adjusting the RP1 wiper to a lower range setting. Series resistor RR33 and grounded capacitor RC22 provide some radio frequency interference filtering to protect the output of amplifier IC6, which output appears as in FIG. 5A and is applied through a shielded cable P1 to adjacent or remote ground station processor circuitry 33 in FIG. 6. FIG. 5C discloses a suitable DC power supply for the FIG. 5 circuit and is substantially conventional, consisting of a diode RD6, inductor RL2, capacitors RC23–26, resistors RR34–36 and a Zener diode RD7, connected as shown between ground and a 12-volt positive supply.

GROUND STATION PROCESSOR CIRCUITRY 33

Ground station processor circuit 33 comprises a microprocessor 201 preferably identical to vehicle unit microprocessor 47 and 3 PROMs 202, 203 and 204 each preferably identical to the PROM 48 of the FIG. 4 vehicle unit. Associated therewith is a utility ROM 205, a data latch 208 and a 3-line to 8-line decoder 209. The embodiment here shown by way of example used RCA models 1802 (microprocessor), 74S472 (PROMs), 1832 (utility ROM), 1852 (data latch) and 74LS36 (decoder). These microprocessor system building blocks are interconnectible in a conventional manner. The functions of blocks 201–209 may instead be accomplished by substituting blocks of different model and manufacture or a composite component integrating the functions of several blocks.

Figure 5:
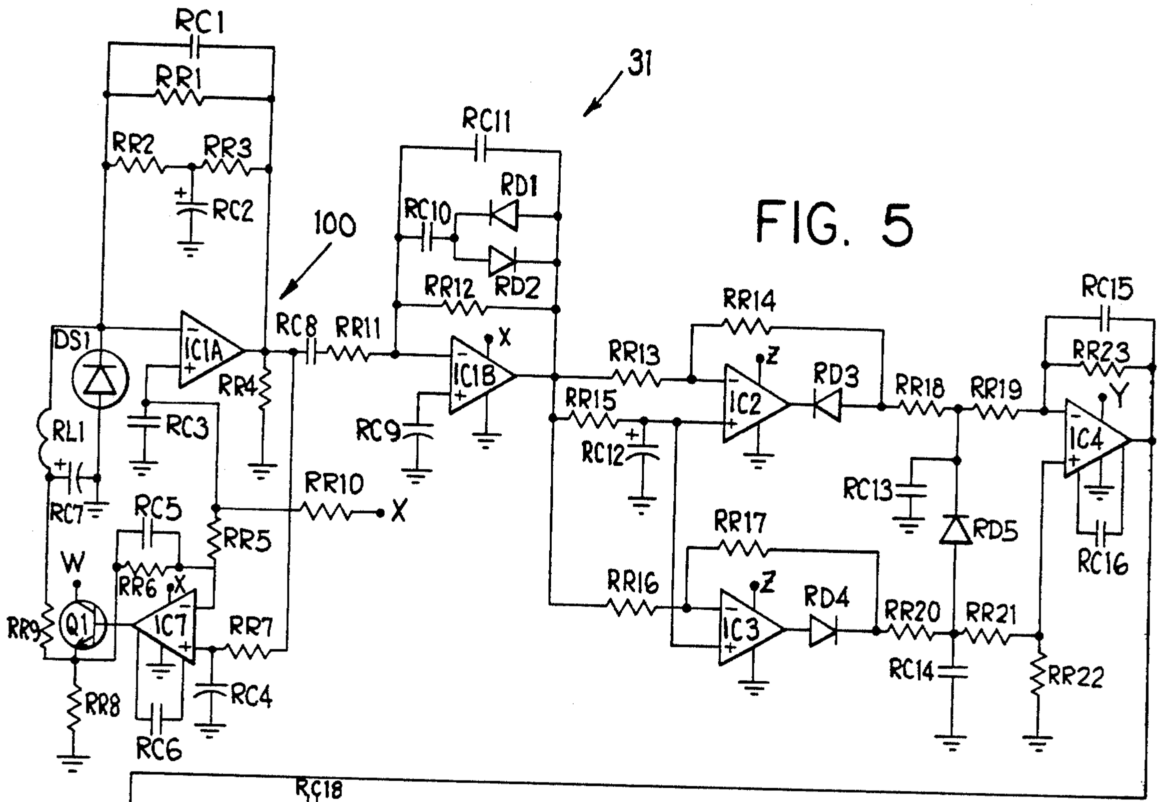
FIG. 5 is a schematic diagram of the infrared receiver circuit of FIG. 2.
Figure 5A:
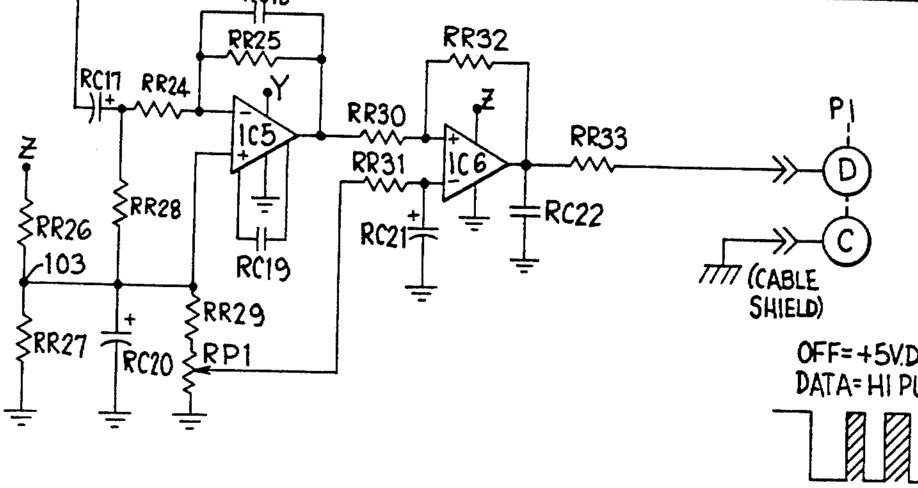
FIG. 5A is a waveform diagram of a portion of a data word as appearing at the output of the FIG. 5 receiver circuit.
Figure 5A:
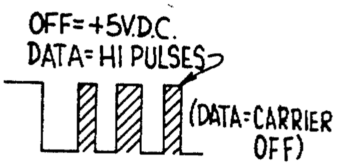
Figure 5C:
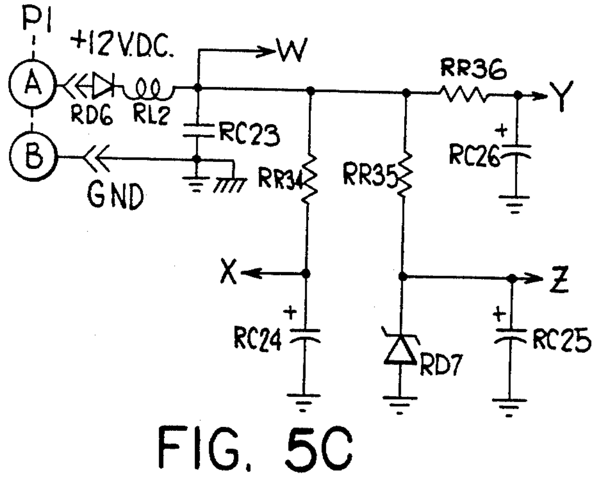
FIG. 5C is a schematic diagram of a power supply circuit for the FIG. 5 receiver circuit.
Figure 5B:
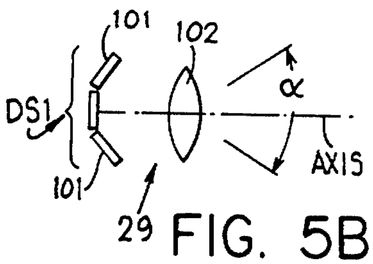
FIG. 5B is a diagrammatic top view of the infrared receiver of FIG. 2.
Figures 6, 6A:
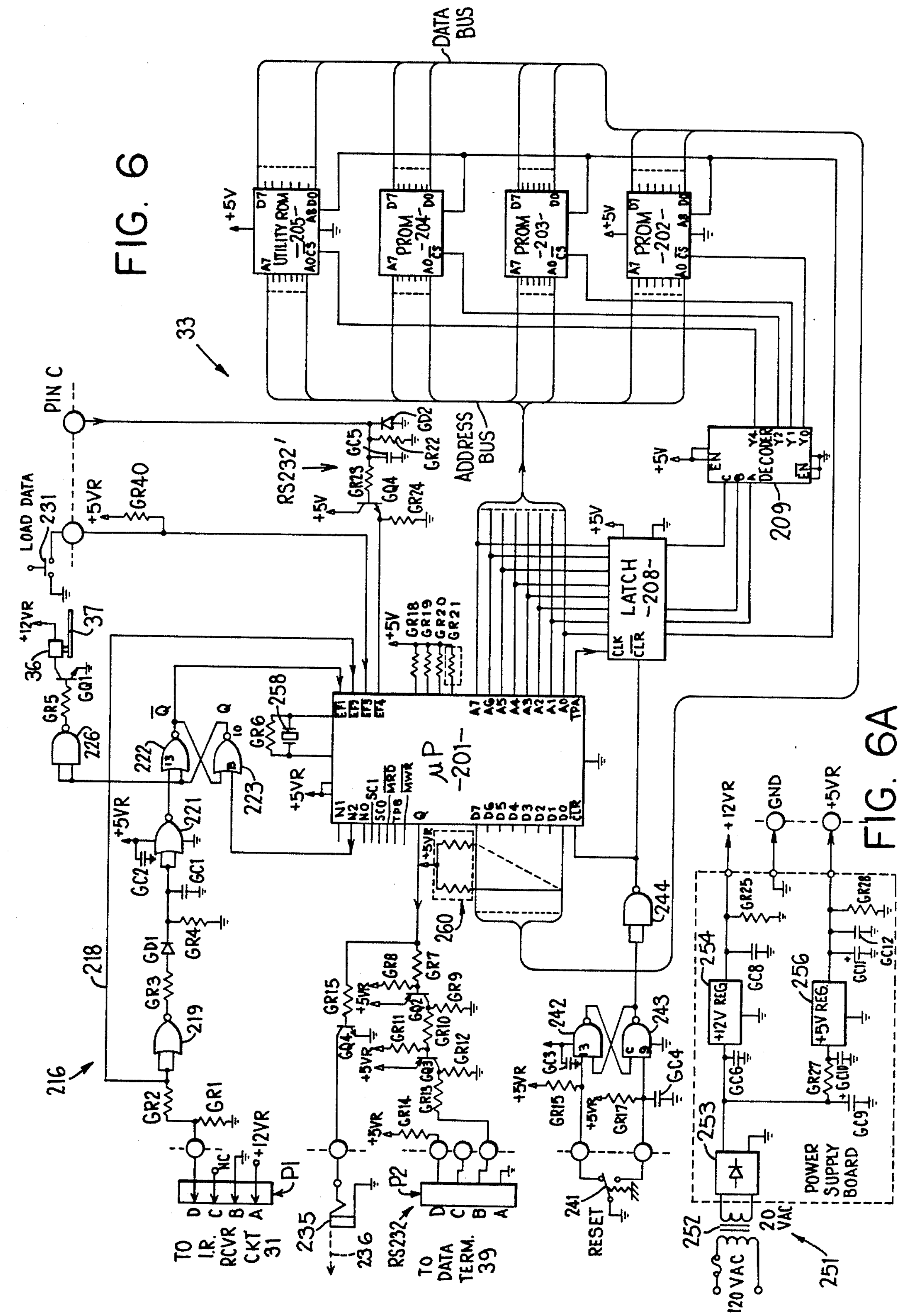
FIG. 6 is a circuit diagram of the ground station processor circuitry of FIG. 2.
FIG. 6A is a power supply for the FIG. 6 circuit.

The processor circuit 33 connects to the infrared receiver circuit 31 through a connector P1 (for example a Bendix 4 pin connector) in which pins A, B, C and D in FIG. 6 connect to correspondingly lettered pins in FIGS. 5 and 5C, providing 12 volts DC potential to FIG. 5C at A, a common ground connection between the FIG. 5C and FIG. 6 circuits at B, a shielded cable connection at C and the transmitted data pulse train from FIG. 5 to FIG. 6 at D. A barrier control circuit 216 is interposed between the data input pin D of the connector P1 and the barrier operator 36 of FIG. 1. In some installations the control circuit 216 may control, instead of or in addition to barrier system 36, 37, some other device such as an audible or visible alarm to be operated in response to arrival of a properly identified vehicle.

The connector data pin D is tied to ground through a resistor GR1. A resistor GR2 applies the data pulse train through a line 218 to the $\overline{EF2}$ input of microprocessor 201 and also to the barrier control circuit 216, namely serially through an inverting NOR gate 219, a resistor GR3, diode GD1, and a second inverting NOR gate 221 to the reset input of a latch comprising cross connected NOR gates 222 and 223. The barrier control circuit 216 further includes a grounded parallel resistor GR4 and capacitor GC1. A capacitor GC2 to ground suppresses any AC noise from a plus 5-volt regulated DC supply 5 VR applied to the circuitry within NOR gate 221.

With no vehicle transmitter in the range of the infrared receiver 29, no data pulses appear, leaving pin D of connector P1 high and resulting in a high on latch reset input pin 13. Thus, the latch 222, 223 is reset. Accordingly, the Q output (pin 10) of the latch is high which, through a NAND gate 226 and series resistor GR5, clamps low the base of a driver transistor GQ1. The transistor GQ1 thus blocks actuation of the barrier operator 36 by breaking the positive 12-volt regulated power supply path therethrough from power supply 12 VR. Hence, barrier 37 remains closed.

When a vehicle transmitter 28 transmits to the infrared receiver 29, receiver circuit 31 sends the resulting data pulses (as in FIG. 5A) through connector pin D and line 218 to the microprocessor 201 input $\overline{EF2}$. When the microprocessor finally determines that a valid data transmission has been received, it pulses high its verified output N2 which at set input pin 8 sets the latch 222, 223. This drops the latch direct output Q low, and through NAND gate 226 turns on transistor GQ1 to actuate the barrier operator 36. The barrier operator 36 may be of any conventional type capable of opening and closing the barrier 37 in dependence on the conductive-nonconductive state of transistor GQ1. The setting of latch 222, 223 also switches high its inverted output $\overline{Q}$ and connected microprocessor input $\overline{EF1}$, to prevent reading of further transmissions of data from the same vehicle.

Microprocessor input $\overline{EF1}$ will remain high, and thus prevent further reading, until data input pin D of connector P1 itself has stayed high for more than a second, signifying that the vehicle has passed beyond the infrared receiver 29 and barrier 37. More particularly, gates 219 and 221, with diode GD1, resistor GR4 and capacitor GC1, function as a peak detector. In detail, negative-going data pulses at connector pin D are inverted by gate 219 and the resulting positive-going pulses charge capacitor GC1 to hold the output of gate 221 and latch reset terminal 13 low. When transmission of data pulses has ceased, the capacitor GC1 discharges slowly through resistor GR4 and eventually (hereafter one second) drops low enough to permit gate 221 to switch to a positive output and reset latch 222, 223 at reset input 13.

When a complete and valid transmission has been received by the microprocessor 201, it serially transmits the received data from its output Q through a conventional RS232 interface to the conventional data terminal 39 (FIG. 2). The RS232 interface outputs the data with the appropriate impedance, voltage levels and pin assignment and incorporates transistors GQ2 and GQ3, resistors GR7–GR13 and a connection through pin B of a further Bendix 4 pin connector P2 to data terminal 39. Pins A and D of connector P2 provide ground and regulated positive 5-volt power supply connections to the data terminal 39.

The RS232 interface includes a further portion RS232′ comprising a diode GD2, resistors GR22–GR24, capacitor GC5 and transistor GQ4. The portion RS232′ is provided for loading of the aforementioned initial vehicle mileage data, at the time of installation of the system on the vehicle, from the keyboard of terminal 39 through pin C of connector P2 into input $\overline{EF4}$ of microprocessor 201, again providing the signal with proper impedance, voltage levels and pin assignment. To load initial vehicle mileage data, a load data switch 231 is actuated manually which pulls down to ground the microprocessor input $\overline{EF3}$, which otherwise is held high through a resistor GR40 to positive supply 5 VR. The drop at pin $\overline{EF3}$ sets the microprocessor to receive data from data terminal 39 through interface portion RS232′ onto microprocessor input $\overline{EF4}$. When the initial vehicle miles entry is complete, the microprocessor supplies the complete data in serial form from its Q output through a resistor GR15 and transistor GQ4 to a data load phone jack 235, connectible by aforementioned shielded patch cord or cable 236 to the vehicle mounted plug and socket connector 22 (FIG. 4) and thereby to the memory of the vehicle microprocessor unit 46.

A latch circuit includes cross connected NAND gates 242 and 243, capacitors GC3 and GC4 to ground and pull-up resistors GR15 and GR17 connecting the reset and set inputs of the latch to the positive supply line 5 VR. A reset switch 241 is shiftable to connect either of latch inputs 13 and 9 to ground. Manual reset switch 241 is manually closable from its NC (shown) position to its NO position. This switches the output applied, by latch 242, 243 onto the paralleled inputs of a NAND gate 244, from logic low to high, in turn causing the NAND gate 244 to switch low the clear inputs $\overline{CLR}$ of the microprocessor 201 and data latch 208. Thereafter, a release of switch 241 back to its NC position resets the latch 242, 243 so that NAND 244 restores the clear inputs $\overline{CLR}$ of the microprocessor 201 and data latch 208 to their normal high condition to restore operation of the microprocessor at the beginning of its program, at address 00. This allows control of the ground station processor circuitry from the keyboard of the terminal 39 for troubleshooting purposes or to select optional program features. Thereafter, proper keyboard entry will then restore operation to normal mode in a conventional manner.

A power supply 251 includes a transformer 252 driven by a fused connection to a commercial 120-volt AC power line and driving a rectifier unit 253. The latter in turn supplies a positive 12-volt regulated line 12 VR through a regulating circuit including capacitors GC6 and GC8, a resistor GR25 and a 12-volt regulator 254. The rectifier 253 also drives a positive 5-volt regulated line 5 VR through a regulating circuit including a capacitors GC9–GC12, resistors GR27 and GR28 and a 5-volt regulator 256.

The ground station microprocessor 201, latch 208 and memory ICs cooperate much like vehicle unit microprocessor 47, latch 76 and PROM 48, except that the ground station contains 4 memory ICs (3 PROMs and 1 ROM) rather than one, its latch 208 has address bus connections and the 3-line to 8-line decoder 209 is added to enable the microprocessor to select among the 4 memory ICs.

As in the vehicle unit, timing pulses from the TPA output of microprocessor 201 clock the latch 208. During the first half of a TPA cycle, the miroprocessor 201 outputs an address onto address bus A0–A7 and the data latch 208 is clocked by such TPA pulse to read the address then displayed on the address bus A0–A7. The data latch 208 puts out a corresponding code to decoder 209 on lines A9, A10 and A15 by which the decoder 209 enables the addressed one of the four memory ICs 202–205, for example PROM 203, which then reads the particular address which the microprocessor 201 has placed on the address bus A0–A7. In this way, address information is applied in parallel to the addressed one of the memory ICs 202–205. In the second half of the TPA pulse, the selected memory IC (for example PROM 203) reads out the instruction data in the called-for address therein and applies such instruction data in parallel onto the eight parallel lines D0–D7 of the data bus which connect to the correspondingly numbered instruction data input pins of microprocessor 201. A set of parallel pull-up resistors 260 connect between the positive supply line 5 VR and corresponding ones of data bus lines D0–D7 as with respect to the vehicle microprocessor 47. As in the latter, the microprocessor 201 is provided with a 2 mHz clock source 258 shunted by resistor GR6. The microprocessor 201 normally continues to be clocked through its program in a conventional manner by outputing on the address bus A0–A7 and repetitively receiving corresponding instructions stored in the memory ICs 202–205.

In the embodiment shown, ROM 205 is a utility ROM containing a canned RCA program covering the communication routines used, which sets up the data rate and translates between the binary data format employed by the infrared receiver circuit of the ground unit and the vehicle unit, on one hand, and on the other hand, the ASCII data format of the particular data terminal 39 employed.

Figure 8:
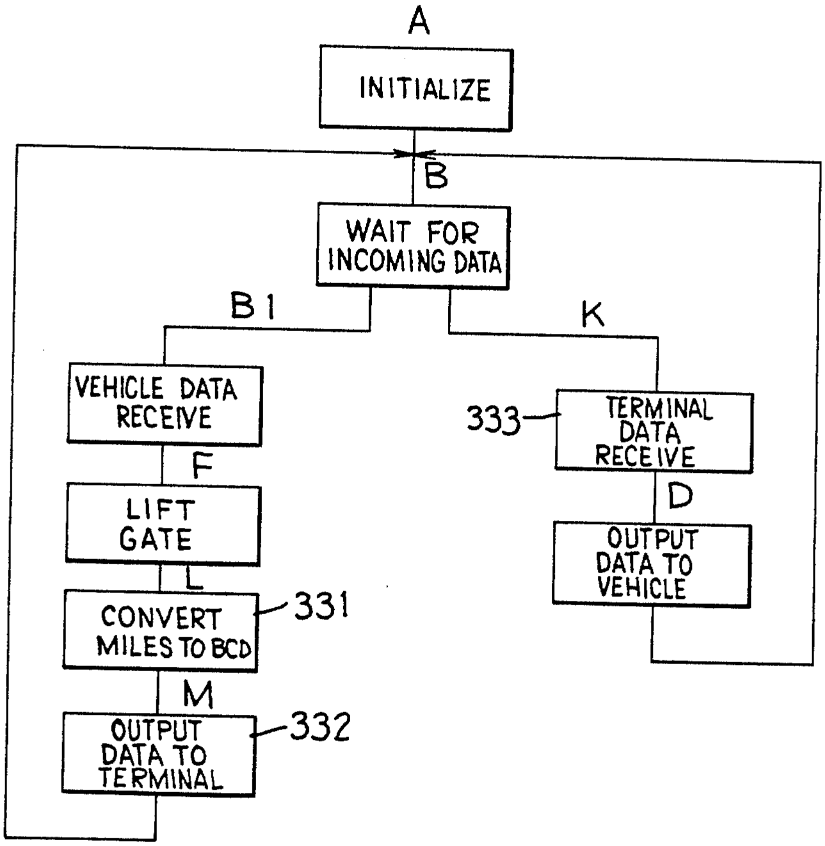
FIG. 8 is a flow chart schematically indicating operation of the FIG. 6 ground station processor circuitry.
Figure 8A:
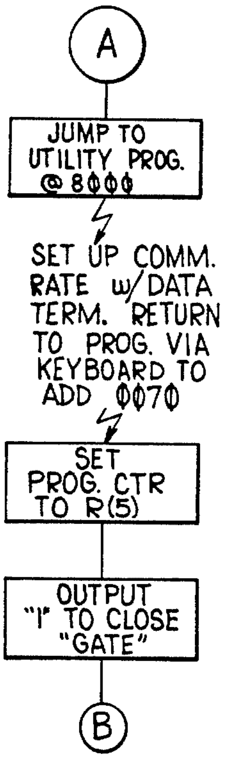
FIGS. 8A–8E are more detailed flow charts respectively corresponding to identified blocks of FIG. 8.
Figure 8B:
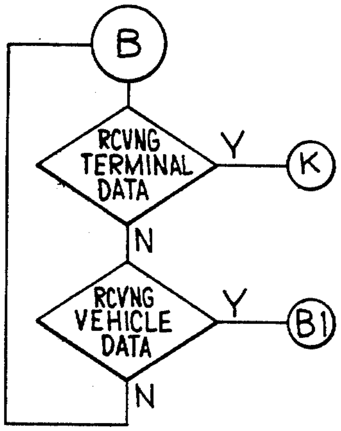
Figure 8C:
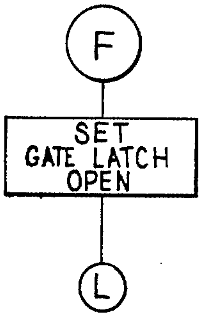
Figure 8D:
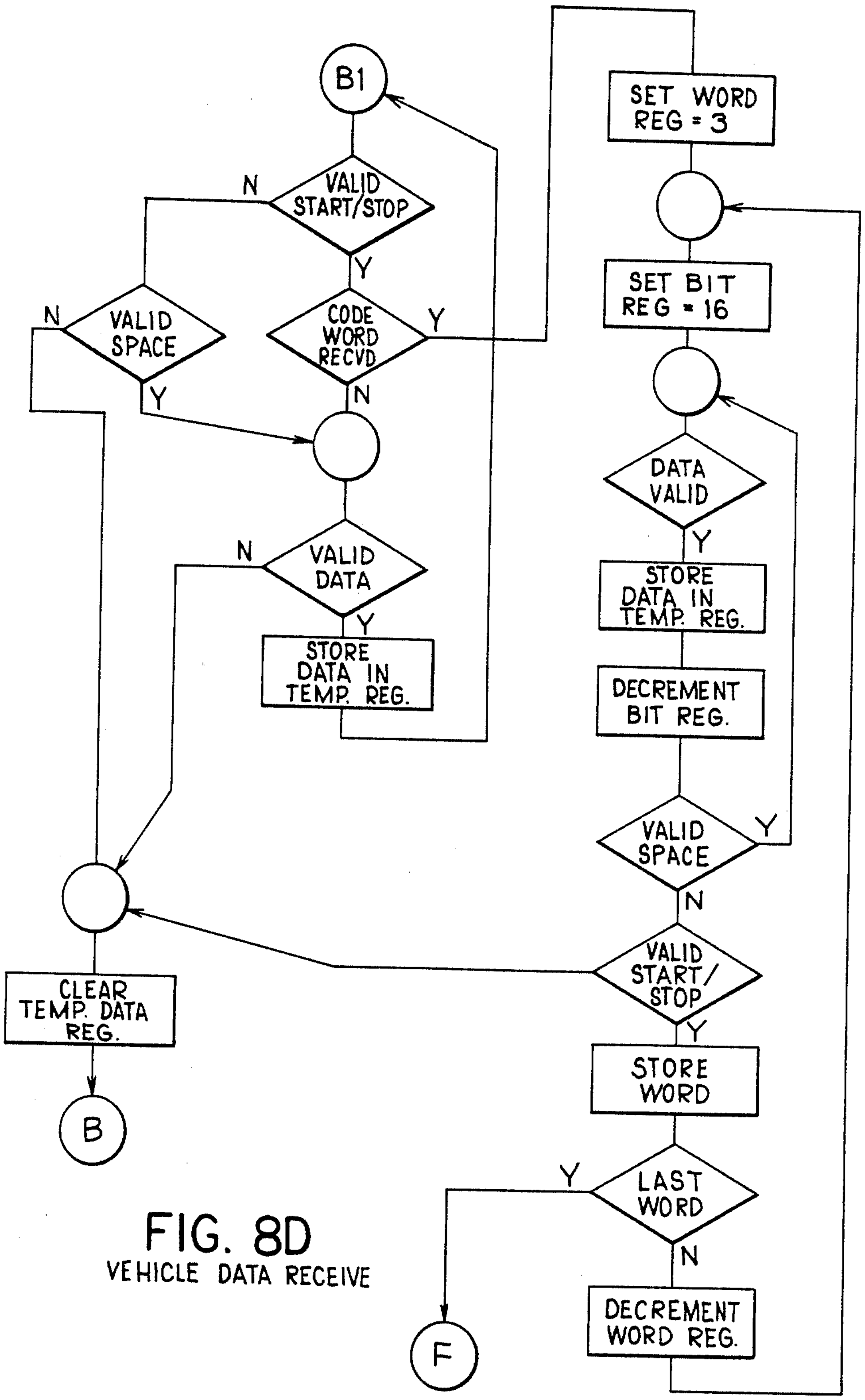
Figure 8E:
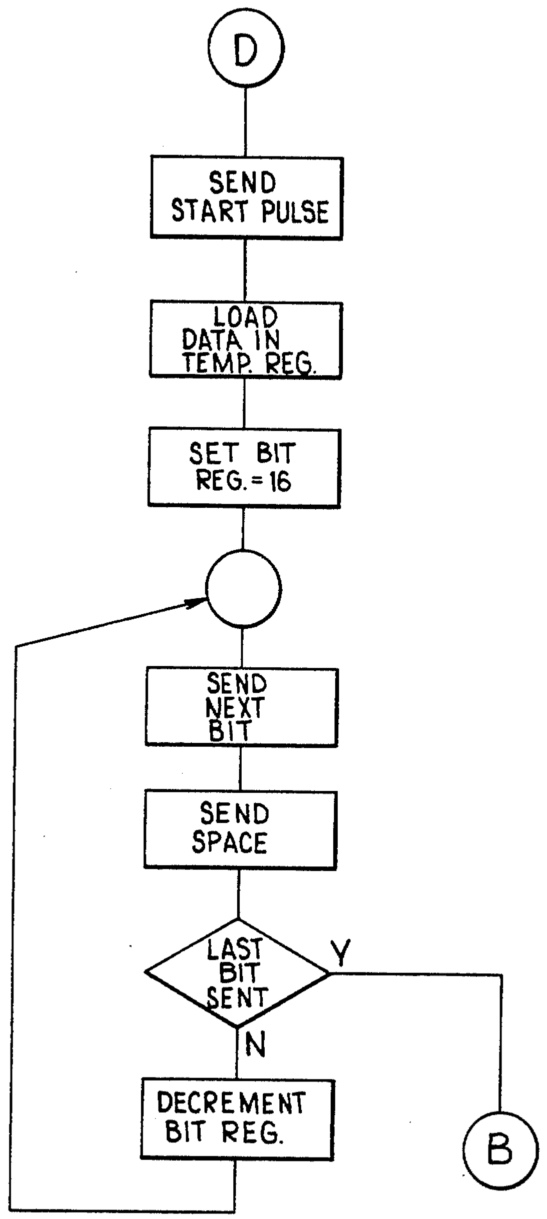

FIG. 7 (and in more detail FIGS. 7A–7F) shows a preferred operating sequence for the vehicle microprocessor unit 46 of FIG. 4. FIG. 8 (and in more detail FIGS. 8A–8E) shows a preferred operating sequence for the microprocessor unit (including elements 201–205, 208 and 209 of FIG. 6).

In FIG. 8, block 331 (convert miles to BCD) performs the very common function of binary to BCD conversion. Blocks 332 and 333 (output data to terminal, terminal data receive) are functions provided by the purchased utility ROM 205 above described. Hence, the functions performed in blocks 331–333 are not further detailed.

While the present invention has been disclosed above in terms of monitoring a vehicle movable past a ground station, the disclosed apparatus is usable or otherwise adaptable to other uses as well. As one example, the present invention can be used to control access to and monitor use of a gasoline or diesel fuel pump on company property, by vehicles of a company fleet, as by providing infrared transmitting means and receiving means respectively at the vehicle fuel inlet and fuel tank outlet with the above-described barrier control usable to enable the fuel pump.

As a further example, the present invention is adaptable to monitor vehicles occupying stalls in a parking area by providing an infrared transducer at each stall for receiving infrared transmission from the vehicle in such stall. The outputs of the several infrared transducers can then be connected, as by multiplexing so as to share a single infrared receiver circuit and ground station processing circuit. If desired, the transmitting or receiving transducer may be separated from the line of sight between vehicle and ground location by a fiberoptic cable.

Instead of using pulse width modulation as discussed with respect to FIG. 4A, digital information can be transmitted by modulated light (infrared or, in some instances, visible) in other ways, such as Amplitude Modulated or Frequency Shift Keyed light transmission. In the latter, a tone decoder may replace the portion of receiver circuit 31 AC coupled by capacitor RC8 to the output of preamplifier IC1A.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a vehicle monitor apparatus for monitoring vehicles in a monitoring location, a monitoring unit comprising a photoelectric infrared receiver and an infrared receiver circuit driven thereby, said receiver circuit comprising a high gain preamplifier with a first input driven by said photoelectric receiver and an ambient light compensation feedback path connected from the output of said preamplifier to said photoelectric receiver and preamplifier first input for holding low the voltage across the photoelectric receiver by closed loop feedback during high light levels.

2. The apparatus of claim 1 in which said ambient light compensation feedback path includes an ambient compensation amplifier of low voltage gain and high current gain driven at a first input by a low frequency component of said preamplifier output and in turn connected by a low frequency network to said photoelectric receiver where the latter drives said preamplifier first input.

3. The apparatus of claim 2 including a DC reference voltage source connected to second inputs of said preamplifier and ambient compensation amplifier, and including a frequency responsive network at the first input of said ambient compensation amplifier for feeding thereto signals of frequency sufficiently low as to correspond to the frequency of variation of ambient light while limiting feeding of higher frequency signals thereto, said low frequency network comprising a low resistance inductor connected in series with a resistor between said photoelectric receiver and the output of said ambient compensation amplifier and with a capacitor connected from a point between said resistor and inductor to a grounded side of said photoelectric receiver, said resistor and capacitor constituting a noise filter.

4. The apparatus of claim 3 in which said ambient compensation amplifier comprises an amplifier unit driving the base of an emitter-follower power driver transistor, and including a negative feedback network comprising in parallel resistor and capacitor arranged for high frequency roll-off and connected from the second input of said ambient compensation amplifier to the emitter of said driver transistor.

5. The apparatus of claim 3 including a first feedback resistor connected across the output and inverting input of said preamplifier for providing high gain at low current level, an RC feedback network connected in parallel with said feedback resistor across said preamplifier and with the capacitant portion thereof grounded for substantially reducing the low frequency gain of said preamplifier by providing a large DC negative feedback therethrough but small high frequency AC negative feedback, and a high frequency roll-off feedback capacitor connected across said feedback resistor and sized to act on frequencies above that applied by said photoelectric infrared receiver.

6. The apparatus of claim 2 including an AC coupled amplifier driven by said preamplifier and including a diode feedback network across said amplifier to limit the peak-to-peak AC output thereof to less than a predetermined voltage, and demodulating means including a negative and positive peak detectors driven by the output of said amplifier and providing out-of-phase modulation signals applied to the inputs of a ground referenced differential amplifier, said preamplifier driving said amplifier at a carrier frequency modulated by an information signal for providing information regarding the monitored vehicle.

7. In a vehicle monitor apparatus for monitoring vehicles in a monitoring location, the combination comprising:

- a vehicle unit mountable in a vehicle and including means for transmitting, on a continuous repetitive basis, information characterizing the vehicle; and
- a monitoring unit mountable at said monitoring location and including means for receiving information transmitted by said vehicle unit,
- said transmitting means including means for producing a data pulse train digitally encoding said information characterizing the vehicle, a timer means for producing a carrier frequency signal of frequency greater than that of said data pulse train, means modulating said carrier by turning same on and off in accord with pulses from said data pulse train, and means applying the data modulated carrier to an infrared emitting member located on said vehicle to be seen from said ground station, said vehicle unit including odometer means for generating pulses in number proportional to miles traveled by the vehicle, fuel level means for generating a time interval proportional to fuel remaining in the vehicle fuel tank, and vehicle identification means establishing a vehicle identification code, said means for producing a data pulse train including means for encoding data indicating miles traveled, fuel level and vehicle identification number.

8. In a vehicle monitor apparatus for monitoring vehicles in a monitoring location, the combination comprising:

- a vehicle unit mountable in a vehicle and including means for transmitting, on a continuous repetitive basis, information characterizing the vehicle; and
- a monitoring unit mountable at said monitoring location and including means for receiving information transmitted by said vehicle unit,
- said vehicle unit including means for producing a data pulse train digitally encoding said information characterizing the vehicle, and means for producing signals related to vehicle mileage and fuel tank level, said pulse train producing means including a microprocessor unit storing a vehicle identification number and including mileage register means and fuel register means sequentially updated from said signal producing means for serially outputting vehicle identification number, mileage and fuel on a continuous loop basis.

9. The apparatus of claim 8 including means for inputting to said microprocessor the initial mileage of the vehicle at the time of installation of the vehicle unit on the vehicle.

10. The apparatus of claim 8 in which said microprocessor has an interrupt input connected to said mileage signal producing means.

11. The apparatus of claim 8 in which said fuel signal producing means includes means for generating a voltage proportional to fuel level, means generating a voltage ramp, means comparing said fuel level voltage with said voltage ramp and producing a signal of time length proportional to fuel level for updating said fuel register.

12. The apparatus of claim 8 including a power supply having a first voltage supply connected through the ignition switch of the vehicle to the vehicle battery for supplying power to said vehicle unit while the vehicle is operating, and a second voltage supply connected directly to said vehicle battery and connected to supply operating potential to said microprocessor to keep alive mileage and fuel data in the registers thereof when the vehicle ignition switch is shut off.

13. In a vehicle monitor apparatus for monitoring vehicles in a monitoring location, the combination comprising:

- a vehicle unit mountable in a vehicle and including means for transmitting, on a continuous repetitive basis, information characterizing the vehicle; and
- a monitoring unit mountable at said monitoring location and including means for receiving information transmitted by said vehicle unit,
- said moitoring unit including a photoelectric infrared receiver and an infrared receiver circuit driven thereby and comprising a high gain preamplifier with a first input driven by said photoelectric receiver and an ambient light compensation feedback path connected from the output of said preamplifier to said photoelectric receiver and preamplifier first input for holding low the voltage across the photoelectric receiver by closed loop feedback during high light levels.

14. The apparatus of claim 13 in which said ambient light compensation feedback path includes an ambient compensation amplifier of low voltage gain and high current gain driven by a low frequency component of said preamplifier output and in turn connected by a low frequency network to said photoelectric receiver where the latter drives said preamplifier first input.

15. The apparatus of claim 13 including an AC coupled amplifier connected to the output of said preamplifier and driving negative and positive peak detectors having frequency responsive means for averaging the high frequency peaks and providing a detected modulation signal, said photoelectric infrared receiver receiving a pulse modulated carrier signal, said modulation signal from said peak detectors constituting said information characterizing said vehicle.

16. In a vehicle monitor apparatus for monitoring vehicles in a monitoring location, the combination comprising:

a vehicle unit mountable in a vehicle and including means for transmitting, on a continuous repetitive basis, information characterizing the vehicle; and a monitoring unit mountable at said monitoring location and including means for receiving information transmitted by said vehicle unit, said monitoring unit including receiver circuit means for reproducing a data pulsed train digitally encoding said information characterizing the vehicle and transmitted by said means for transmitting in said vehicle unit, said receiving means further including a ground station processor circuit comprising microprocessor means, a member to be controlled in response to identification of a vehicle, a control circuit including a first path for applying said data pulse train to an input of said microprocessor, said control circuit including a second path incorporating a latch means responsive to lack of a data pulse train for maintaining said controlled member in a rest state, said latch having input connected to said microprocessor means and responsive to approval by said microprocessor means of said data pulse train for setting the latch and thereby switching said controlled member to a nonrest state indicating passage of a properly identified vehicle, said microprocessor means having a further input responsive to the set condition of said latch means for preventing further reading of data from the same vehicle, said control circuit including time delay means responsive to discontinuance of data pulse trains at the input of said control circuit for a minimum delay time sufficient to permit a vehicle to leave the monitoring location, to thereafter reset said latch and thereby return said controlled member to its rest condition to ready said receiving means for arrival of a further vehicle.

17. The apparatus of claim 16 in which said monitoring units include the data terminal having a keyboard, said receiving means including an interface circuit connected between said data terminal and said microprocessor, said interface circuit having a first part for transmitting data to said data terminal carrying said information characterizing the vehicle, said interface circuit having a second part for loading of the initial mileage of a vehicle from said data terminal keyboard through said microprocessor to the data output thereof, and a cable connection temporarily connectible between said data output and storage means in said vehicle unit for storing of said initial mileage of said vehicle.

18. The apparatus of claim 16 including reset latch means actuable for resetting said microprocessor to the beginning of its programmed sequence.

19. The apparatus of claims 7, 8, 13 or 16 in which said transmitting means includes an infrared light emitting diode mounted at the front end of a tubular housing having clamping means thereon for clamping between members of a vehicle grill.

20. The apparatus of claims 7, 8, 13 or 16 in which said receiving means includes a horizontally extended concave array of photovoltaic elements behind a lens means for focusing infrared light thereon from an approaching vehicle.

21. In a vehicle monitor apparatus for monitoring vehicles in a monitoring location, the combination comprising:

a vehicle unit mountable in a vehicle and including means for transmitting, on a continuous repetitive basis, information characterizing the vehicle, said transmitting means including an infrared light emitting diode mounted at the front end of a tubular housing having clamping means thereon for clamping between members of a vehicle grill; and a monitoring unit mountable at said monitoring location and including means for receiving information transmitted by said vehicle unit.

22. In a vehicle monitor apparatus for monitoring vehicles in a monitoring location, the combination comprising:

a vehicle unit mountable in a vehicle and including means for transmitting, on a continuous repetitive basis, information characterizing the vehicle, and a monitoring unit mountable at said monitoring location and including means for receiving information transmitted by said vehicle unit, said receiving means including a horizontally extended concave array of photovoltaic elements behind a lens means for focusing infrared light thereon from an approaching vehicle.

23. In a vehicle monitor apparatus for monitoring vehicles in a monitoring location, the combination comprising:

a vehicle unit mountable in a vehicle and including means for transmitting, on a continuous repetitive basis, information characterizing the vehicle, and a monitoring unit mountable at said monitoring location and including means for receiving information transmitted by said vehicle unit, said transmitting means including means for producing a data pulse train digitally encoding said information characterizing the vehicle, a timer means for producing a carrier frequency signal of frequency greater than that of said data pulse train, means modulating said carrier by turning same on and off in accord with pulses from said data pulse train, and means applying the data modulated carrier to an infrared emitting member located on said vehicle to be seen from said monitoring location.

* * * * *